United States Patent
Al-Mulhem et al.

(10) Patent No.: US 10,683,726 B1
(45) Date of Patent: Jun. 16, 2020

(54) ISOLATION POLYMER PACKER

(71) Applicant: Saudi Arabian Oil Company, Dhahran (SA)

(72) Inventors: Abdulrahman Abdulaziz Al-Mulhem, Dhahran (SA); Ayman Mohammed Almohsin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/397,409

(22) Filed: Apr. 29, 2019

(51) Int. Cl.
  *E21B 33/138* (2006.01)
  *C09K 8/508* (2006.01)
  *C09K 8/504* (2006.01)
  *E21B 43/08* (2006.01)

(52) U.S. Cl.
  CPC .......... *E21B 33/138* (2013.01); *C09K 8/5045* (2013.01); *C09K 8/5083* (2013.01); *C09K 8/5086* (2013.01); *C09K 2208/10* (2013.01); *E21B 43/08* (2013.01)

(58) Field of Classification Search
  None
  See application file for complete search history.

(56) References Cited

U.S. PATENT DOCUMENTS

| | | | | |
|---|---|---|---|---|
| 5,697,441 A * | 12/1997 | Vercaemer | ............ | E21B 33/124 166/285 |
| 8,672,023 B2 | 3/2014 | O'Malley et al. | | |
| 2009/0205818 A1 | 8/2009 | Klunge et al. | | |
| 2012/0103607 A1* | 5/2012 | Fitzpatrick | ............ | E21B 33/134 166/278 |
| 2013/0116156 A1* | 5/2013 | Lin | ......... | C09K 8/588 507/225 |
| 2015/0027710 A1* | 1/2015 | Miller | .................... | C09K 8/426 166/300 |
| 2018/0193261 A1 | 7/2018 | Lee et al. | | |

FOREIGN PATENT DOCUMENTS

| | | |
|---|---|---|
| CN | 105755185 | 7/2016 |
| CN | 107814869 | 3/2018 |
| GB | 2503627 | 1/2014 |

OTHER PUBLICATIONS

Al-Ghazal et al., "A new temporary chemical packer enables efficient stimulation of a lower zone in a HPHT gas well," SPE 161651, presented at the Abu Dhabi International Petroleum Exhibition and Conference on Nov. 11-14, 2012, 6 pages.

Freyer et al., "Swelling Packer for Zonal Isolation in Open Hole Screen Completions," SPE 78312, presented at the SPE 13th European Petroleum Conference, Oct. 29-31, 2002, 5 pages.

Pan et al., "Tough, Stretchable, Compressive, Novel Polymer/Graphene Oxide Nanocomposite Hydrogels with Excellent Self-Healing Performance," ACS Applied Materials and Interfaces, published online Oct. 11, 2017, 28 pages.

Target Intervention No., "Real-Time, Fully Electric TP1 Straddle Tool," targetinvention.no, available on or before Feb. 13, 2018, 1 page.

\* cited by examiner

*Primary Examiner* — Andrew Sue-Ako

(74) *Attorney, Agent, or Firm* — Fish & Richardson P.C.

(57) ABSTRACT

A system and method for isolating a zone in a wellbore having a sand screen including applying hydrogel into an annulus between the sand screen and the geological formation to form a hydrogel packer in the annulus.

29 Claims, 7 Drawing Sheets

US 10,683,726 B1

ISOLATION POLYMER PACKER

TECHNICAL FIELD

This disclosure relates to a wellbore for the production of hydrocarbon.

BACKGROUND

A borehole or wellbore may be drilled into a hydrocarbon formation or reservoir in the Earth for the exploration or production of crude oil and natural gas. An example of a problematic section of a wellbore is a water zone in which water enters the wellbore from the hydrocarbon formation or underlying water aquifer. The influx of water into the wellbore during drilling and during the subsequent production of oil and gas can add cost. The production of water along with the oil and gas from the hydrocarbon formation can lead to surface processing of the water and injection of the water back into the hydrocarbon formation for disposal or pressure maintenance. Such processing and injection of water produced from the wellbore water zone causes increased costs of the oil and gas production.

SUMMARY

An aspect relates to a method of treating a wellbore in a geological formation for isolation of a water zone. The wellbore has a sand screen. The method includes deploying a first application packer into the wellbore to a lower target depth below the water zone. The method includes discharging hydrogel from the first application packer through the sand screen into an annulus between the sand screen and the geological formation to form a lower hydrogel packer in the annulus at the lower target depth. The method includes deploying a second application packer into the wellbore to an upper target depth above the water zone. The method includes discharging hydrogel from the second application packer through the sand screen into the annulus to form an upper hydrogel packer in the annulus at the upper target depth.

Another aspect relates to a method of isolating a water zone in a wellbore in a geological formation. The wellbore has a sand screen. The method includes deploying an application packer into the wellbore to below the water zone. The method includes injecting self-healing hydrogel from the application packer through the sand screen into an annulus between the sand screen and the geological formation to form a lower hydrogel packer in the annulus.

Yet another aspect relates to a wellbore in a geological formation. The wellbore includes a sand screen. The wellbore has a lower hydrogel packer below a water zone in an annulus between the sand screen and the geological formation to facilitate isolation of the water zone. The wellbore has an upper hydrogel packer above the water zone in the annulus to facilitate isolation of the water zone. The lower hydrogel packer and the upper hydrogel packer each include a self-healing hydrogel.

Yet another aspect relates to a method of isolating a water zone in a wellbore in a geological formation. The wellbore has a sand screen. The method includes deploying a straddle packer into the wellbore. The straddle packer has a chamber holding hydrogel. The method includes ejecting the hydrogel from the chamber through nozzles of the straddle packer to inject the hydrogel through the sand screen into an annulus between the sand screen and the geological formation to form a lower hydrogel packer in the annulus below the water zone. The method includes ejecting the hydrogel from the chamber through the nozzles to inject the hydrogel through the sand screen into the annulus to form an upper hydrogel packer in the annulus above the water zone.

The details of one or more implementations are set forth in the accompanying drawings and the description presently. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
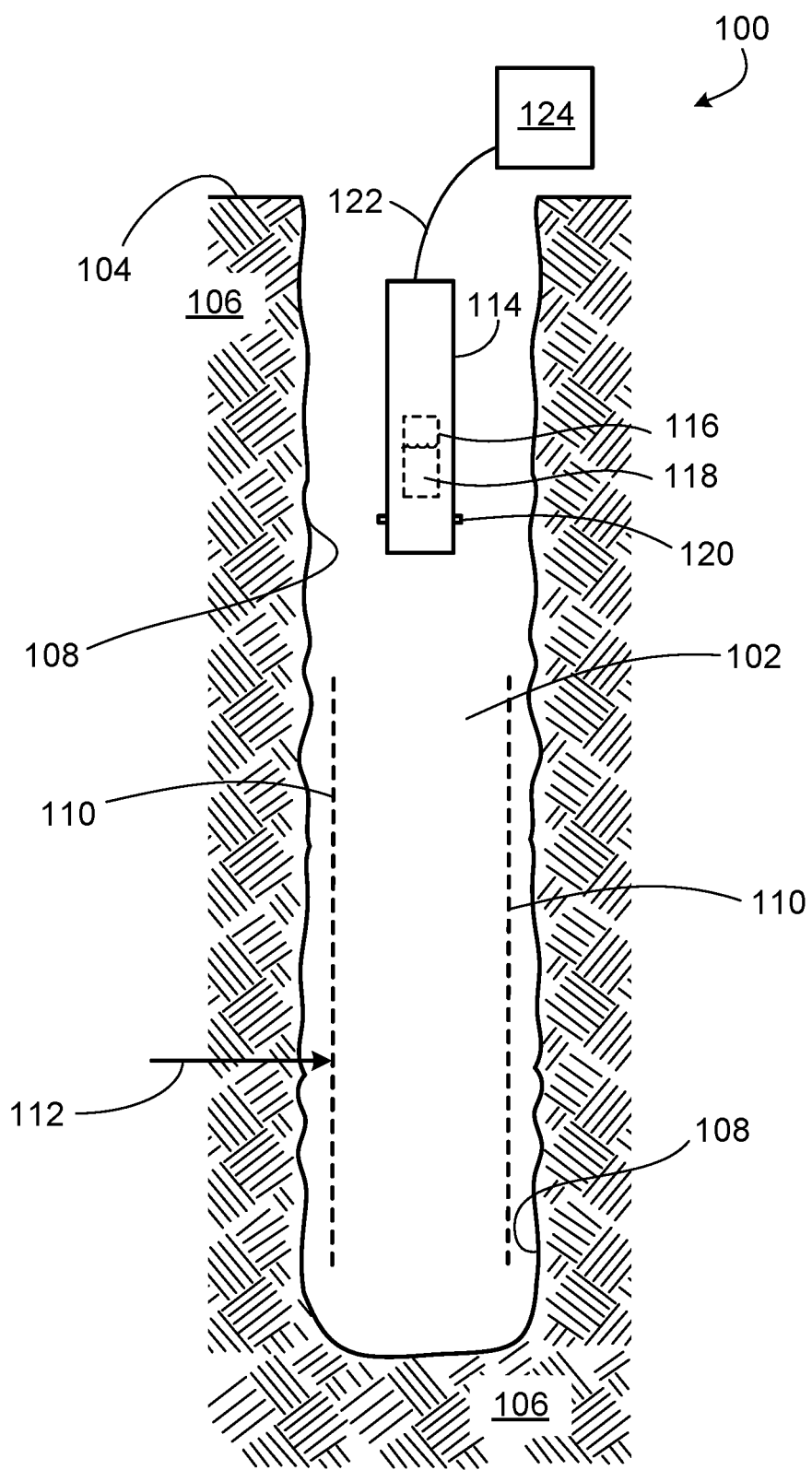
FIG. 1 is a diagram of a well site having a wellbore into a geological formation and having a sand screen and a water zone.

A wellbore formed in a geological formation for the production of crude oil or natural gas may have a water zone where water enters the wellbore from the geological formation. A straddle packer may be deployed into the wellbore to apply a chemical treatment for water shutoff to isolate the water zone. The straddle packer (or straddle packer assembly) typically has upper and lower expandable elements and a nipple(s) in between the expandable elements. The expandable elements may be expandable seals or inflatable sealing elements. The lower expandable element is positioned below the water zone and expanded or inflated to engage (seal against) the wellbore wall (formation surface). The upper expandable element is positioned above the water zone and expanded to seal against the formation surface in the wellbore. The expansion of the upper and lower expandable elements mechanically isolates the water zone.

A chemical may be provided from the straddle packer through the straddle packer nipple to damage or plug the formation surface in the water zone. The damage may extend into the formation. The applied chemical may plug the geological formation at the water zone to restrict or prevent introduction of water from the formation into the wellbore. The chemical may be, for example, a polymer or a gel. The chemical treatment (water shutoff) may be a chemical treatment isolation of the water zone. After the chemical treatment, the straddle packer may be removed from the wellbore. Alternatively, the straddle packer may remain in the wellbore to continue to mechanically isolate the water zone. Thus, the isolation of the water zone may be a combination of chemical treatment and mechanical isolation. The straddle packer may have an internal passage (flow path) for flow of wellbore fluid.

During the chemical treatment, the inflated upper and lower expandable elements of the straddle packer prevent the chemical being applied from escaping the water zone. The mechanical isolation by the straddle packer keeps the water-shutoff chemical in the water zone and thus prevents the chemical from contaminating other portions of the wellbore.

However, if the wellbore is completed with a sand screen, the sand screen interferes with the mechanical isolation by the straddle packer. The expandable elements of the straddle packer do not adequately seal against the wellbore wall (formation surface) due to the presence of the sand screen. Thus, the chemical applied (for water shutoff) escapes from the water zone through the annulus between the sand screen and the geological formation to other zones or portions of the wellbore.

To prevent the treatment chemical escaping through the screen-formation annulus, present embodiments prepare the wellbore (having a sand screen) for deployment of a straddle packer to apply the chemical treatment for water shutoff. For example, certain embodiments form an upper polymer packer in the screen-formation annulus above the water zone and a lower polymer packer in the screen-formation annulus below the water zone.

FIG. 1 is a well site 100 having a wellbore 102 through the Earth surface 104 into a geological formation 106 in the Earth crust. The geological formation 106 may also be labeled as a hydrocarbon formation or hydrocarbon reservoir. Hydrocarbon is produced from the geological formation 106 through the wellbore 102 to the surface 104. The hydrocarbon may be crude oil or natural gas, or both. To form the wellbore 102, a hole is drilled into the geological formation 106 to generate a formation surface 108 as an interface for the wellbore 102 with the geological formation 106. The wellbore 102 may be openhole or have a casing (not shown).

In the illustrated embodiment, the wellbore 102 has a sand screen 110 along a portion of the geological formation 106 that produces sand. The sand screen 110 reduces entry of sand into the wellbore 102 from the formation 106. The sand screen 110 may be a stand-alone screen and function as a filter of the sand. The sand screen 110 may be a mesh screen, wire screen, wire-wrapped screen, or slotted liner. In operation, the formation sand 106 may mechanically bridge across the openings or slots of the sand screen 110. The sand particles may bridge on a slot, for example, with the width of the slot less than two particle diameters. The sand particles may bridge on openings or perforations of the screen 110, for example, with the perforation diameter not exceeding about three particle diameters.

The illustrated wellbore 102 has a water zone to be isolated. The isolation when implemented may stop interaction in the water zone between the formation 106 and the fluid flowing through the wellbore 102. At the water zone, water 112 enters the wellbore 102 from the geological formation 106. The wellbore 102 wall in the water zone may be the geological formation 106 interface (formation surface 108) defining that portion of the wellbore. The water zone may be isolated to restrict introduction of the water 112 into the wellbore 102. The water zone may be isolated to prevent receipt of the water 112 into the fluid flowing through the wellbore 102. For example, the isolation may inhibit flow of the water 112 into the produced hydrocarbon flowing through the wellbore 102 to the Earth surface 104.

The isolation of the water zone may involve chemical or mechanical treatment, or both. The chemical treatment may damage the formation 106 to plug or reduce porosity by plugging the pores at the formation surface 108 in the water zone. The chemical treatment may be a polymer treatment or cement treatment.

The mechanical treatment may install equipment to isolate the water zone. The mechanical isolation may include installing packers or sealing elements above and below the water zone to mechanically isolate the water zone from the remainder of the wellbore 102. In some implementations, the equipment installed may have an inner diameter or flow path for fluid flowing through the wellbore 102. The wellbore fluid may be production fluid flowing upward through the wellbore 102 to the Earth surface 104. The wellbore fluid may flow through the installed equipment and the isolated water zone but not interface with the formation 106 in the isolated water zone. The deployed equipment prevents exposure of the wellbore fluid to the formation 106 in the isolated water zone.

The presence of the sand screen 110 may obstruct or hinder the isolation treatment. The sand screen 110 may interfere with the installation of the isolating equipment and with the chemical treatment.

In response, present embodiments condition the wellbore 104 for receipt of the isolation equipment and for employment of the chemical treatment. To prepare the wellbore for isolation treatment of the water zone, embodiments may inject a hydrogel through the sand screen 110 above and below the water zone. An application packer(s) 114 is lowered into the wellbore 102 to inject a hydrogel through the sand screen 110 at target depths of the wellbore 102 above and below the water zone. See, for example, hydrogel portions 202, 204 in FIG. 2. The hydrogel fills the annulus between the sand screen 110 and the formation surface 108 at those locations to facilitate the subsequent intervention to isolate the water zone. The application packer 114 may be labeled as a deploying packer in deploying hydrogel into the annulus. The hydrogel in the annulus may be characterized as a polymer packer or hydrogel packer.

This preparation for isolation treatment provides the hydrogel to support the subsequent installation of isolation equipment and facilitate the ensuing chemical treatment for water shutoff. The hydrogel injected into the screen-formation annulus above the water zone may be a base to receive or support an upper isolation packer or sealing element (expandable seal, expandable or inflatable sealing element). The hydrogel injected into the screen-formation annulus below the water zone portion may be a base to receive a lower isolation packer or sealing element.

The hydrogel in the annulus (between the formation surface 108 and the screen 110) above and below the water zone may facilitate the subsequent chemical treatment (water shutoff) of the water zone. The hydrogel as polymer packers in the annulus may prevent or reduce flow of the treatment chemical through the annulus to outside of the treatment area or water zone to other regions of the wellbore 102.

The application packer 114 may include a chamber 116 (inner cavity) containing hydrogel 118 to be applied. The application packer 114 may have nozzles 120 to inject the hydrogel 118 from the chamber 116 through the sand screen 110. In one implementation, the application packer 114 has a piston to push the hydrogel 118 from the chamber 116 through the nozzles 120. The application packer 114 may have at least four nozzles 120. In some implementations, the application packer 114 is a straddle packer having the chamber 116 and the nozzles 120.

The hydrogel 118 injected from the application packer 114 (discharged or ejected through the nozzles 120) may flow through the sand screen 110 and contact the formation surface 108. The injected hydrogel may fill the annulus between the sand screen 110 and the formation surface 108 at that injection target portion of the wellbore 102.

The hydrogel may be a self-healing hydrogel. Therefore, the hydrogel when damaged may heal. The hydrogel may be damaged by the ejection through the nozzles 120 and the injection through sand screen 110. The hydrogel may be subsequently damaged by wellbore conditions while the hydrogel resides in the annulus. The hydrogel may self-heal to maintain integrity of the hydrogel as a hydrogel packer in the annulus.

To deploy the application packer 114, a deployment extension 122 from a dispenser 124 may lower the application packer 114 into the wellbore 102. For application packers 114 that are temporary or retrievable, the deployment extension 122 may retrieve (raise, pull, remove) the application packer 114 from the wellbore 102. In some implementations, the deployment extension 122 is coiled tubing and the dispenser 124 is a coiled tubing reel. In other implementations, the deployment extension 122 is a wireline and the dispenser 124 is a wireline truck. The deployment extension 122 may be a conduit, cable, slickline, work string, drill string, or jointed pipe.

As indicated, an example of a problematic section of the wellbore 104 is a water zone. Water 112 may enter at a water zone into the production fluid. The water zone may include a permeable or fractured interface of the formation surface 108 with the wellbore 102.

The present techniques accommodate multiple variations in the deployment of the application packers 114 that form polymer packers in the screen-formation annulus to facilitate the subsequent isolation of a water zone in the wellbore 102. A single application packer 114 or two application packers 114 may be deployed. The application packers 114 may be removed from the wellbore 102 or remain in the wellbore 102. Two application packers 114 may be deployed in tandem in a downhole tool assembly. The application packers 114 may be deployed as components of a straddle assembly. The application packer 114 may be a straddle packer or modified straddle packer. A straddle packer may be modified to incorporate features (for example, the hydrogel chamber 116 and nozzles 120) of the application packer 114.

A portion of the well formation in wells completed with sand screens may need to be isolated for chemical treatment for water shutoff. The wellbore may be openhole or cased. Typical straddle packers (whether hydraulic or electric) may provide for isolation of a wellbore zone but generally not in wellbores completed with a sand screen. Traditional straddle packers and bridge plugs provide zonal isolation in a wellbore but typically not along a wellbore depth having a sand screen. In contrast, aspects of the present disclosure provide for treating or isolating a problematic zone (for example, water zone) in a wellbore having a sand screen. The isolation addresses the annulus between the sand screen and the geological formation (sand face). The techniques may provide an application packer or modified straddle packer for zonal isolation in wells completed with a sand screen. The problematic zone can be a water-producing zone within a hydrocarbon-producing zone.

Present embodiments include an application packer (for example, a modified straddle packer) having a chamber or inner cavity that carries a polymer hydrogel. When the application packer is activated, the application packer injects the hydrogel through the sand screen to facilitate isolation of the zone of interest. The application packer may be a straddle packer having a chamber to carry the polymer hydrogel to isolate the zone including to fill behind the screen with the polymer. The application packer (for example, straddle packer) having polymer hydrogel in a chamber may deploy (form) a polymer hydrogel packer. When activated, the application packer anchors and discharges (ejects) the hydrogel from the chamber through application-packer nozzles. The hydrogel ejected from the application-packer nozzles flows through the sand screen to settle in the screen-formation annulus to form the hydrogel packer to facilitate isolation of that portion of the formation. These hydrogel packers can be formed above and below the target zone of interest to create an isolated zone behind the screen so that a chemical treatment can be squeezed into the target zone without the chemical invading other areas of the well.

The application packer can be a straddle packer that remains in the wellbore to mechanically isolate the wellbore in the area of interest and implement the chemical treatment of the subsequent intervention. In certain embodiments, the application packer as a modified straddle packer can be employed for mechanical isolation and also for chemical treatment isolation.

Figure 2:
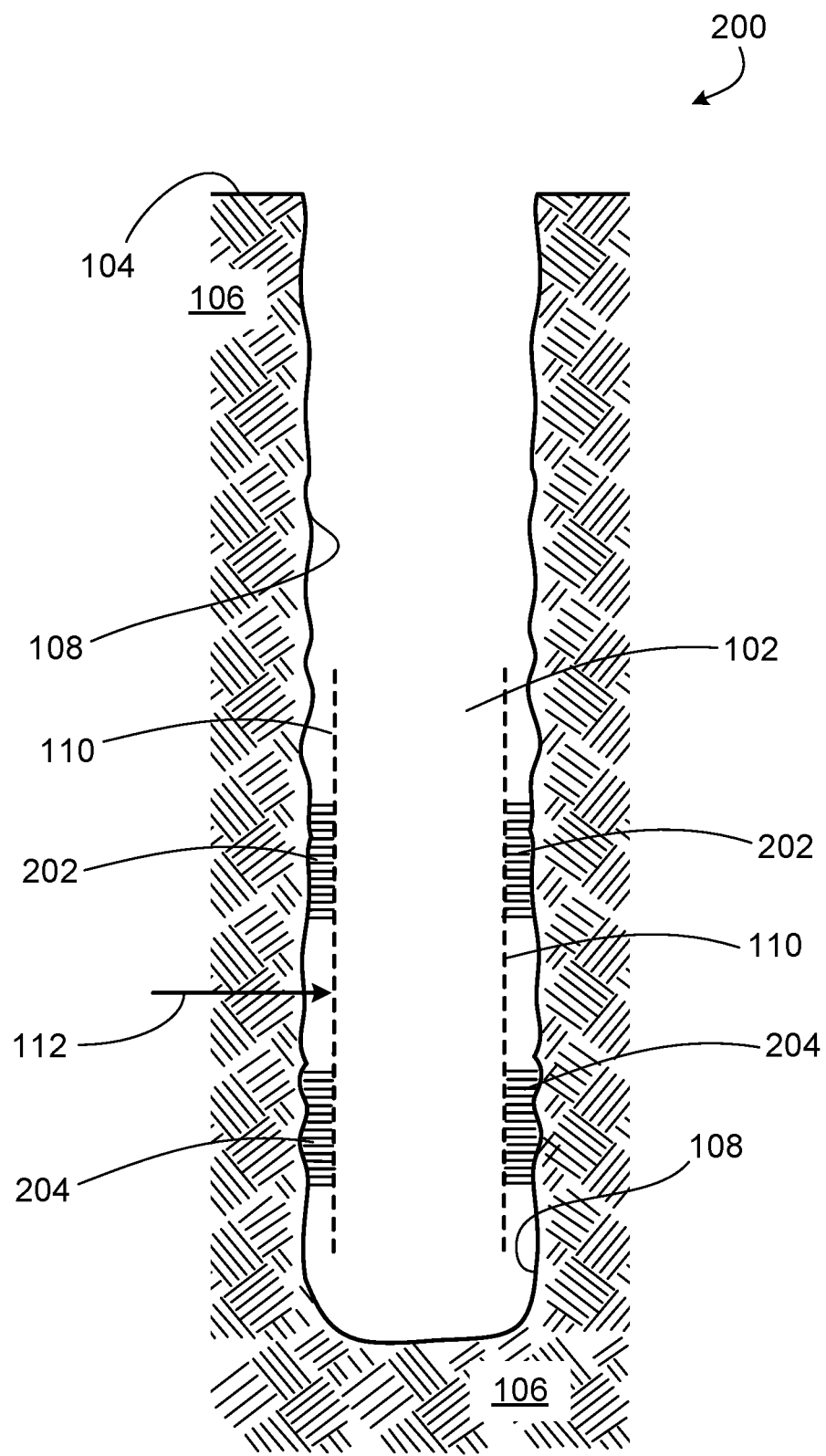
FIG. 2 is a diagram of the well site of FIG. 1 but with hydrogel portions in the screen-formation annulus above and below the water zone.

FIG. 2 is a well site 200 that is the same as the well site 100 of FIG. 1, except hydrogel portions 202, 204 are deployed. The wellbore 102 has the sand screen 110. The slot width or screen gauge of the sand screen 110 may be sized to equal grain size of the formation 106 sand at the 10-percentile point of the sieve analysis. Thus, in operation, the larger 10% of the sand grains may be stopped by the openings of the screen 110 and this larger sand may stop the remaining 90% of the sand grains. Slots may be sized to cause bridging of the largest 10% of the formation sand particles. This largest 10% of the sand particles may fill the annulus between the screen 110 and the formation surface 108. This largest 10% of the sand particles in the annulus may be a filter of the smaller 90% of the sand particles.

In FIG. 2, the wellbore 102 has an upper hydrogel portion 202 above a water zone and a lower hydrogel portion 204 below the water zone. These hydrogel portions 202, 204 were provided by the application packer(s) 114 (see FIG. 1). These hydrogel portions 202, 204 in the screen-formation annulus may be characterized or labeled as chemical packers, polymer packers, gel packers, or hydrogel packers. In some implementations, the density of the hydrogel 118 or hydrogel portions 202, 204 (hydrogel packers) approximates the density of water. The density may be at least 0.998 grams per cubic centimeter at 21° C. The viscosity of the hydrogel 118 and the hydrogel portions 202, 204 may be at least 20,000 centipoise at 21° C.

The application packer(s) 114 applied (injected) the hydrogel 118 to form the upper hydrogel portion 202 and the lower hydrogel portion 204. Both hydrogel portions 202, 204 fill the annulus between the sand screen 110 and the formation surface 108 at the respective target locations. The hydrogel portions 202, 204 are preparation for subsequent intervention to isolate the water zone. The ensuing intervention may involve installation of a straddle packer to chemically-treat for water shutoff. This follow-on chemical treatment may stop or restrict the introduction of water 112 at that zone from the formation 106 into the wellbore fluid (for example, production fluid) flowing through the wellbore 102. The chemical applied for water shutoff may be, for example, a polymer or a gel.

In some embodiments to prepare for the isolation of the water zone, a single application packer 114 as a re-settable application packer 114 is deployed to form the hydrogel portions 202, 204. The re-settable application packer 114 is lowered into the wellbore 102 to the lower target depth and set (for example, via an anchoring module of the packer 114) to inject hydrogel through the sand screen 110 to form the lower hydrogel portion 204. The application packer 114 is then unset and raised to the upper target depth. The application packer 114 is set again to inject hydrogel through the sand screen 110 to form the upper hydrogel portion 202. The application packer 114 may be retrieved from the wellbore 102.

In other embodiments, two application packers 114 are utilized to form the hydrogel portions 202, 204. A first application packer 114 is deployed to a target depth in the wellbore 102 below the water zone to inject hydrogel through the sand screen 110 to form the lower hydrogel portion 204. A second application packer 114 is deployed to a target depth in the wellbore 102 above the water zone to inject hydrogel through the sand screen 110 to form the upper hydrogel portion 202. In some implementations, the two application packers 114 may be deployed in tandem in an application assembly. In particular embodiments, the application assembly may be a downhole tool arrangement or straddle assembly. After injection of the hydrogel, the first application packer 114 and the second application packer 114 (individually or as components of an assembly) may be removed from the wellbore 102 to the surface 104.

After the hydrogel portions 202, 204 are formed (for example, via one application packer 114 or two application packers 114), a straddle packer may then be deployed. A straddle packer may be a twin sealing element device with a perforated nipple to inject a fluid into the water zone. The straddle packer may be hydraulically activated (for example, giving differential pressure) or electrically activated (movements driven electrically) to expand or inflate the sealing elements. The upper and lower sealing elements may be expanded simultaneously. In addition, the straddle packer may have a motive component (for example, pump) to discharge or eject the fluid through the nipple into the wellbore 102.

The straddle packer is lowered into the wellbore to the depth of the water zone. An upper expandable element (an upper expandable seal) of the straddle packer expands (for example, inflates) against or adjacent the upper hydrogel portion 202 to seal with the wellbore 102 wall (formation surface 108). A lower expandable element (a lower expandable seal) of the straddle packer expands against or adjacent the lower hydrogel portion 204 to seal with the wellbore 102 wall. Thus, with the aid of the hydrogel portions 202, 204, the straddle packer may mechanically isolate the water zone.

The straddle packer may provide a chemical through the straddle-packer nipple(s) into the wellbore water zone for the chemical treatment (water shutoff) of the formation 106 at the water zone. The hydrogel portions 202, 204 may prevent or reduce escape of the treatment chemical through the screen-formation annulus to outside of the water zone.

The straddle packer may include through-tubing disposed between the lower and upper expandable elements for the flow of wellbore fluid. The straddle packer prevents exposure of the wellbore fluid to the water zone. The wellbore fluid may be production fluid including hydrocarbon such as crude oil or natural gas. A through-tube coupling the upper and lower sealing elements may allow for flow of wellbore fluid through the isolated water zone. The wellbore fluid may flow through the equipment (straddle packer) and the isolated water zone but not interface with the formation 106 in the isolated water zone.

In some embodiments, the application packer 114 is a straddle packer. A straddle packer may incorporate features of the application packer 114. For example, a straddle packer may be equipped with the chamber 116, the nozzles 120, and an anchoring mechanism (for example, mechanical slips). Therefore, the straddle packer is modified as compared to a conventional straddle packer. The modified straddle packer may have conventional straddle-packer features of expandable elements for sealing and a nipple to apply chemical for chemical treatment. The modified straddle packer may also have the aforementioned features (not found on a conventional straddle packer) for ejection of a hydrogel.

The application packer 114 as a modified straddle packer may be deployed into the wellbore 102. The modified straddle packer may be anchored at a lower target location to discharge or eject the hydrogel from the chamber 116 though the nozzles 120 to form the lower hydrogel portion 204. The modified straddle packer may be de-anchored from the lower target location. The modified straddle packer may be raised to the upper target location to eject hydrogel from the chamber through the nozzles 120 to form the upper hydrogel portion 202. The modified straddle packer may be de-anchored from the upper target location.

The modified straddle packer may then be positioned to straddle the water zone with the upper and lower expandable elements (expandable seal or sealing elements) inflating to mechanically isolate the water zone. The modified straddle packer may discharge or eject a chemical through the straddle packer nipple for the water-shutoff chemical treatment that damages or plugs the formation surface 108 (and formation matrix) in the water zone. The hydrogel portions 202, 204 (as polymer packers) prevent or reduce flow of the treatment chemical through the screen-formation annulus to other wellbore locations or zones outside of the water zone. In some implementations, the application packer 114 as a modified straddle packer remains in place to continue mechanical isolation of the water zone after the chemical treatment. The expandable elements may have an inner diameter or flow passage for wellbore fluid. The modified straddle packer may include through-tubing (for example, coupling the lower and upper expandable elements) for the flow of wellbore fluid through the straddle packer, as discussed earlier.

A hydrogel is a macromolecular polymer gel constructed of a network of crosslinked polymer chains. Hydrogels are synthesized from hydrophilic monomers by either chain growth or step growth. A functional crosslinker promotes network formation. The formulation may be cured to form (crosslink) the hydrogel. By weight, hydrogels are mostly liquid but behave similar to solids due to the three-dimensional cross-linked network within the liquid hydrogel. Water is typically the main component of the solution. Hydrogels may contain at least 90 weight percent (wt %) water. The water is retained within the polymer network via the hydrophilic polymer chains. The hydrophilic polymer chains in the hydrogel form a solid held together by crosslinks. In general, hydrogels are absorbent natural or synthetic polymeric networks.

The hydrogel 118 in present embodiments may be a self-healable and rock-adhesive hydrogel with tunable multifunctionality as a chemical or polymer packer to isolate a wellbore zone behind a sand screen completion. In certain embodiments, the hydrogel includes cationic polyacrylamide (PAM) and graphene oxide (GO). The GO may be GO nanosheets. In particular embodiments, the hydrogel is formed by the free radical polymerization (FRP) of acrylamide (AM) and 2-(dimethylamino) ethylacrylatemethochloride (DAC) in the presence of the GO.

The ratio of AM and DAC monomers in the polymerization of the PAM for the hydrogel can be specified to adjust properties of the PAM copolymer. The mechanical properties and self-healing ability can be tuned by the GO content and the ratio (for example, mass ratio) of AM and DAC. The mass ratio of AM to DAC can be tuned, for example, in the range of 1:1 to 1:2 or the range of 1:1 to 1:4 to reach desired mechanical performance of the hydrogel. The ionic bonds between DAC and GO and the hydrogen bonds between AM and GO can dissipate energy and rebuild the network. In some implementations, no additional monomers are utilized other than AM and DAC in the polymerization (in the presence of GO) of the PAM hydrogel.

Polydopamine (PDA) may be added to the hydrogel to promote adhesiveness of the hydrogel. The hydrogel may be a mussel-inspired PDA-PAM hydrogel with self-healing ability and adhesiveness. A ratio of the PDA to the PAM in the hydrogel may be specified. Alternatives to PDA as an adhesive promoter include sodium silicate (for example, for carbonate rocks) and aminosaline.

A ratio of GO relative to the PAM or PDA-PAM may be specified in the composition. The GO promotes the ability of the hydrogel to heal after rupture. The self-healing ability and mechanical strength are enhanced through multiple interactions between GO and the PAM copolymer of AM and DAC. An alternative to the GO nanosheets as a crosslinker in the hydrogel for the promotion of the self-healing ability of the hydrogel include nanoparticle fillers such as clays (clay minerals), carbon nanotubes, and graphene nanosheets.

The hydrogel may self-heal without external stimuli after rupture of the hydrogel. Once the hydrogel penetrates through the sand screen 110, the hydrogel may self-heal, adhere to the rock formation, and form as a polymer packer (hydrogel packer) in the screen-formation annulus. The polymer composition of the hydrogel (for example, PDA-PAM hydrogel) may be specified for the zonal isolation in a sand-screened wellbore 102. The hydrogel may be for zonal isolation as a chemical packer or polymer packer. As indicated, the hydrogel 118 and the hydrogel portions 202, 204 may have at least 90 wt % water.

The hydrogel 118 as a polymer gel may be cured prior to placement of the hydrogel 118 into the chamber 116 of the application packer 114. Thus, the hydrogel 118 may be already cured as a bulk gel prior to discharge (ejection) from the chamber 116 through the application packer nozzles 120. The volume of the hydrogel 118 can be specified according to the desired size of the hydrogel packer. After the hydrogel 118 is injected as bulk (formed gel) under pressure to flow through the sand screen 110, the hydrogel 118 penetrates through the screen 110 and may rupture. The hydrogel 118 may be ruptured when squeezed through the sand screen 110 and then self-heals in the screen-formation annulus.

In some implementations, the hydrogel 118 is not yet cured when placed into the chamber 116. The polymerization of the monomers that make up the PDA-PAM hydrogel may be initiated downhole. The free radical polymerization (FRP) may be thermally-initiated or light-initiated. The polymerization can be driven thermally (via reservoir temperature) or by light (for example, via laser). If light is involved, a light source may positioned, for example, adjacent the nozzles 120.

Aspects of the present disclosure are directed to a hydrogel packer deployed by an application packer that holds the hydrogel in a chamber or inner cavity. In some implementations, the application packer is an electrical or hydraulic straddle packer incorporating the chamber containing the hydrogel. The hydrogel may be self-healing and rock-adhesive hydrogel. The self-healing may be facilitated by the crosslinking in the hydrogel as discussed. The adhesion of the hydrogel to the rock may be enhanced by an adhesion promoter in the hydrogel as also discussed. The deployed application packer when activated may inject the polymer hydrogel through from the chamber through nozzles (for example, four nozzles) to go through the sand screen and isolate the zone between the formation sand and the screen. The thermally-induced-self-healable and rock-adhesive hydrogel allows repetitive self-healing after damage when formation heat is induced. The presence of graphene sheets (or GO sheets) with the PAM in the hydrogel may increase the storage modulus of the hydrogel. Thus, the tensile strength and break strain of healed hydrogel may recover to approach 100% (to at least 97%) of the original strength and elongation.

Figure 3:
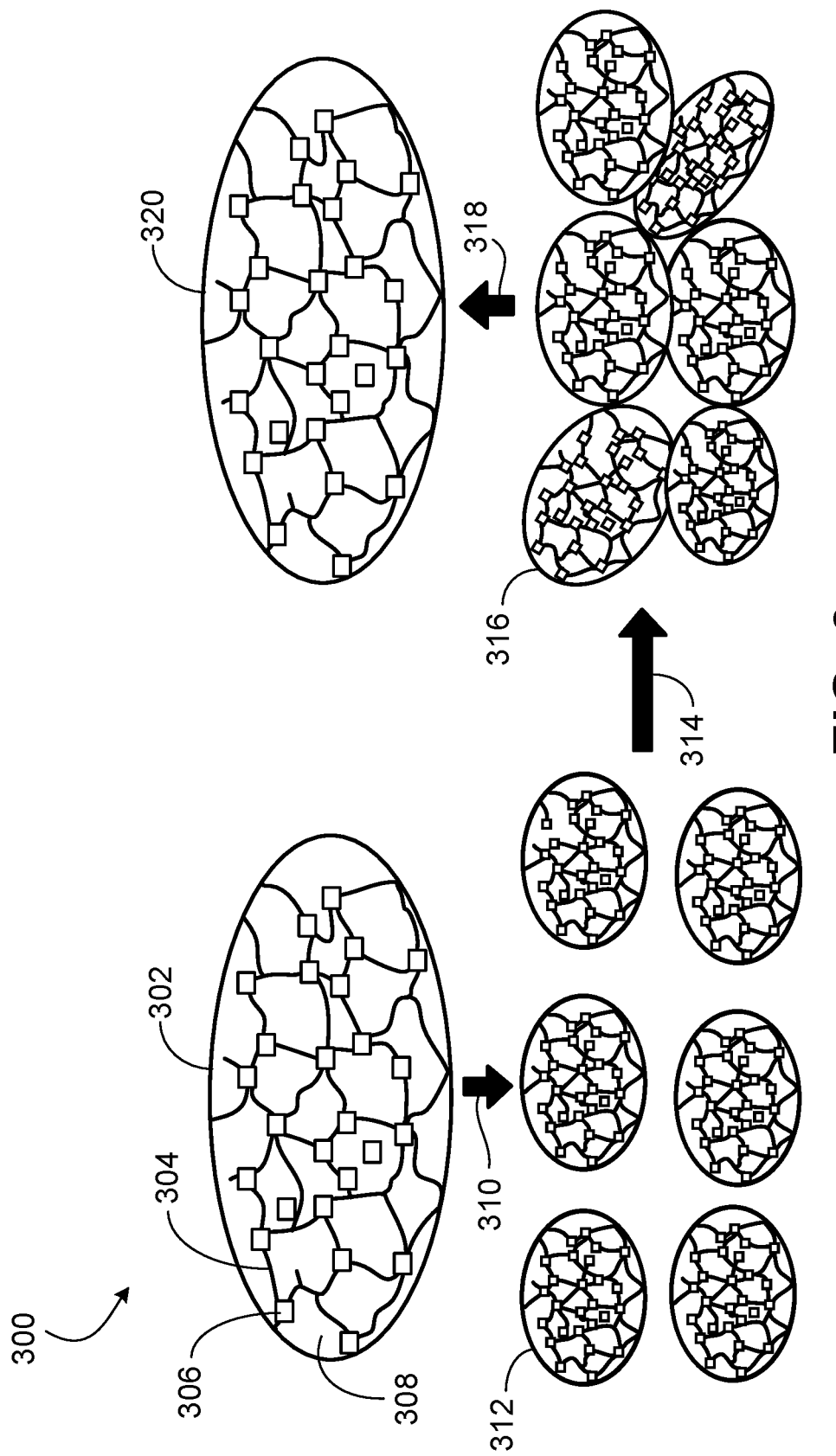
FIG. 3 is a sequence diagram of a hydrogel undergoing damage and self-healing.

FIG. 3 is a sequence representation 300 of a hydrogel 302 undergoing damage and self-healing. This sequence may be experienced by the hydrogel injected from an application packer through a wellbore sand screen, such as in the preparation for isolation of a wellbore water zone. The hydrogel 302 has a network of polymer chains 304 and GO nanosheets 306 at crosslinks of the polymer chains 304. The liquid 308 of the hydrogel 302 is typically water. The liquid 308 may include additives such as an adhesion promoter (for example, PDA).

The depiction of the hydrogel 302 may be characterized as a pristine or healed condition. The hydrogel 302 may represent the hydrogel 118 in the chamber 116 of the application packer 114 (see FIG. 1).

The hydrogel 302 is subjected to damage 310 that breaks the hydrogel 302 into subparts 312. The damage 310 may occur as the hydrogel 302 is injected from a nozzle of an application packer through a wellbore sand screen. The hydrogel 302 as may flow through the sand screen into the screen-formation annulus. The routing of the hydrogel 302 through the nozzle and the forcing of the hydrogel 302 through the sand-screen mesh or slots may damage the hydrogel 302. In addition, the hydrogel (for example, portions 202, 204) in the screen-formation annulus may be subjected to ongoing damage from wellbore conditions (for example, wellbore pressure and wellbore temperature).

The damage 310 may break the hydrogel 302 into the hydrogel subparts 312. The hydrogel subparts 312 may undergo self-healing 314 such that the hydrogel subparts 312 become agglomerated hydrogel subparts 316. Continued self-healing 318 may give a restored or healed hydrogel 320 (in the screen-formation annulus as a hydrogel packer) that approaches or is the same as the hydrogel 302.

As discussed, the deploying application packer 114 that injects the self-healing hydrogel (gel polymer) can be a packer with an anchoring mechanism and having a chamber that contains the self-healing hydrogel. When activated in the zone of interest (the water zone), the application packer 118 may anchor and squeeze the hydrogel 118 out through application-packer nozzles 120 (See FIG. 1). The hydrogel 118 will go through the sand screen 110 into the screen-formation annulus to heal. The hydrogel as applied may isolate the annulus below and above the zone that needs water-shutoff chemical treatment.

After the application packer injects a hydrogel into the screen-formation annulus, a conventional straddle packer may be utilized for chemical treatment. On the other hand, an application packer as a modified straddle packer may inject a hydrogel into the screen-formation annulus and also have a chemical for the subsequent chemical treatment for water shutoff. The present treatment accounts for the annulus between the sand screen and the formation sand face to isolate a zone for water shutoff. Implementations address placement of water shutoff chemicals into a wellbore completed with a sand screen. An impact may be to improve oil productivity from wells suffering from water production and having a sand screen. The following FIGS. 4-8 further clarify exemplary sequences of action to isolate a zone of interest (water zone) for further chemical treatment without affecting the hydrocarbon producing zones.

Figure 4:
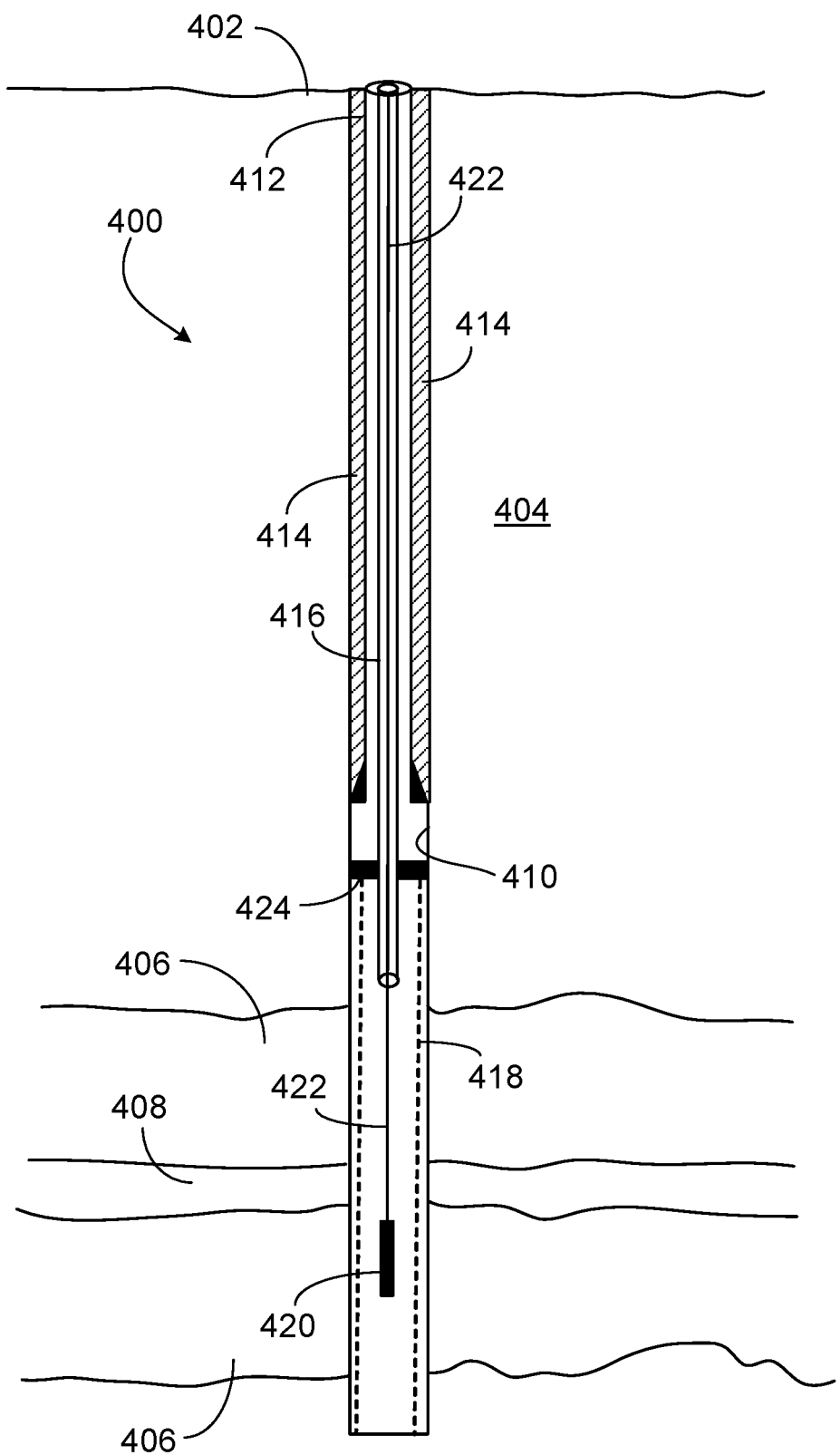
FIG. 4 is a diagram of a wellbore formed through the Earth surface into a geological formation.

FIG. 4 is a wellbore 400 formed through the Earth surface 402 into a geological formation 406. The geological formation includes hydrocarbon reservoir formations 406 and an intervening water producing zone 408. Water may enter the wellbore 400 from the water producing zone 408. That portion of the wellbore 400 may be labeled as a water zone. Produced water may refer to geological formation water that is co-produced with the crude oil or natural gas. The produced water can cause production problems by generating emulsions, scale, and corrosion. The production of water may incur operational cost because the produced water must typically be separated from the hydrocarbons.

An inner surface of the wellbore 400 is the formation surface 410 of the geological formation 404. In the illustrated embodiment, a portion of the wellbore 400 has a casing 412 with cement 414 disposed between the casing 412 and the formation surface 410. The wellbore 400 has a production tubing 416 (through a production packer 424) for the flow of produced fluid including hydrocarbon to the surface 402. The hydrocarbon may be crude oil or natural gas that enters the wellbore 400 from the hydrocarbon reservoir formations 406.

The produced fluid flowing upward through the production tubing 416 also includes water that enters the wellbore 400 from the water producing zone 408. It may be desired to isolate the water zone in the wellbore 400 to prevent water from water producing zone 408 entering the wellbore 400 and becoming a component of the production fluid. The isolation of the water zone may be mechanical or chemical (or a combination of mechanical and chemical) by a straddle packer.

However, the wellbore 400 has a sand screen 418 which may preclude intervention via a conventional straddle packer. The sand screen 400 is along a portion of the geological formation 404 that produces sand. The sand screen 418 reduces entry of sand into the wellbore 400 from the formation 404.

The presence of the sand screen 418 may inhibit or interfere with isolation of the water zone with a conventional straddle packer. Therefore, an application packer 420 may first be utilized to prepare the wellbore 400 (having the sand screen 418) for receipt of a conventional straddle packer. The application packer 420 may be analogous to the application packer 114 of FIG. 1.

The application packer 420 may be a deploying packer that deploys (forms) hydrogel packers in the annulus between the sand screen 418 and the formation surface 410. The application packer 420 has a chamber (inner cavity) housing the hydrogel and nozzles to discharge or eject the hydrogel from the chamber through the sand screen 418 into the annulus to form the hydrogel packers. The hydrogel may be a self-healing hydrogel. Therefore, the hydrogel packers may self-heal while residing in the annulus.

The application packer 420 may install (form) an upper hydrogel packer in the annulus above the water zone and a lower hydrogel packer in the annulus below the water zone. Therefore, a conventional straddle packer may be subsequently deployed. An upper expandable element (expandable seal) of the subsequently-deployed straddle packer may seal against or adjacent the upper hydrogel packer. The lower expandable element of the straddle packer may seal against or adjacent the lower hydrogel packer.

Thus, with the aid of the hydrogel packers, the straddle packer may mechanically isolate the water zone and also introduce chemical treatment into the water zone for water shutoff. The presence of the hydrogel packers enhances mechanical isolation by preventing flow of wellbore fluid through the screen-formation annulus. The presence of the hydrogel packers enhances chemical treatment (water shutoff) by preventing flow of treatment chemical through the screen-formation annulus to other depths of the wellbore 400.

To form the hydrogel packers in the annulus, a single application packer 114 or multiple application packers 420 may be employed. If a single application packer 420 is utilized, the application packer 420 may be re-settable so to deploy both the upper and lower hydrogel packers. If two application packers 420 are employed, one may form the upper hydrogel packer and the other may form the lower hydrogel packer. In some implementations, two application packers 420 may be deployed in tandem as components of an application assembly and positioned contemporaneously to form the upper and lower hydrogel packers, respectively. The application packer 420 may be a straddle packer. The straddle packer may be modified to have features of the application 420. The application packer 420 as a straddle packer may deploy the hydrogel packers and also subsequently mechanically and chemically isolate the water zone.

In some embodiments, the deployment of the application packer 420 into the wellbore 400 may be rigless. A rigless operation may be a well intervention conducted with equipment and support facilities that preclude the requirement for a rig over the wellbore 400. The deployment extension 422 may be coiled tubing, wireline, or slickline for rigless deployment.

Figure 5:
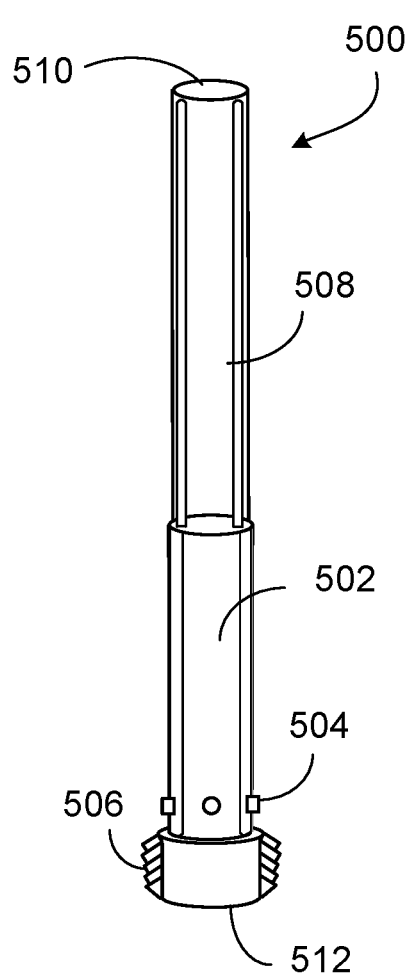
FIG. 5 is a perspective view of an application packer.

FIG. 5 is an exemplary application packer 500 which may be analogous in some embodiments to the application packer 114 of FIG. 1 and the application packer 420 of FIG. 4. The application packer 500 has an uphole end 510 and a downhole end 512. In the illustrated embodiment, a lower section 502 of the application packer 500 has an internal chamber (cavity) for holding hydrogel. The application packer 500 has nozzles 504 to eject the hydrogel from the internal chamber into the wellbore. As discussed, the hydrogel may be injected through a sand screen to form a hydrogel packer in the annulus between the sand screen and the wellbore wall (formation surface). In embodiments, the application packer 500 has four nozzles 504. The nozzles 504 are spaced at 90-degree intervals around the packer 500.

The application packer has an anchoring module 506 to anchor or set the application packer 500 against the sand screen and formation surface. In one implementation, the anchoring module 506 include mechanical slips that expand to anchor the application packer 500. The application packer 500 may be anchored to eject the hydrogel from the internal chamber through the nozzles 504 (and through the sand screen) into the screen-formation annulus. In the illustrated embodiment, an upper section 508 of the application packer 500 has a piston (for example, hydraulic) to push or drive the hydrogel from the internal chamber through the nozzles 504.

Figure 6:
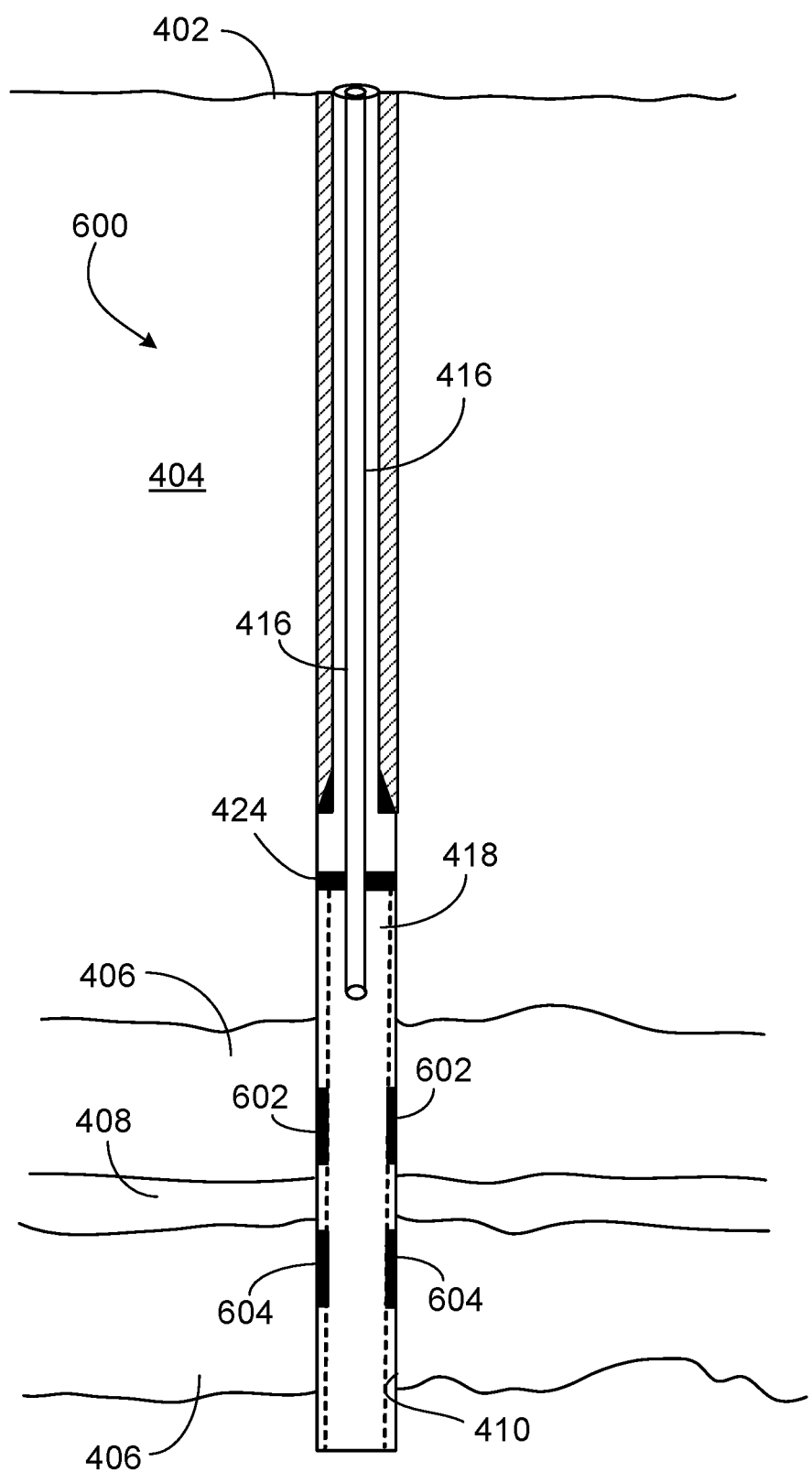
FIG. 6 is a diagram of the wellbore of FIG. 4 but with hydrogel packers formed in a sand-screen annulus above and below a water zone.

FIG. 6 is a wellbore 600 formed through the Earth surface 402 into the geological formation 404. The wellbore 600 may be analogous to the wellbore 400 of FIG. 4, except that the wellbore 600 has an upper hydrogel packer 602 above the water producing zone 408 and a lower hydrogel packer 604 below the water producing zone 408. The upper hydrogel packer 602 and the lower hydrogel packer 604 are formed in the annulus between the sand screen 418 and the formation surface 410. The hydrogel packers 602, 604 may be formed (deployed) by the application packer(s) 420 (see FIG. 4), as discussed earlier. The deployment of the hydrogel packers 602, 604 may be to prepare for isolation of the wellbore 600 water zone (at the formation water-producing zone 408) with a straddle packer, as also discussed earlier. Isolation of the water zone with the straddle packer (not shown) may reduce or prevent water from the water-producing zone 408 entering the wellbore 600 and combining with the production fluid flowing upward through the production tubing 416.

Figure 7:
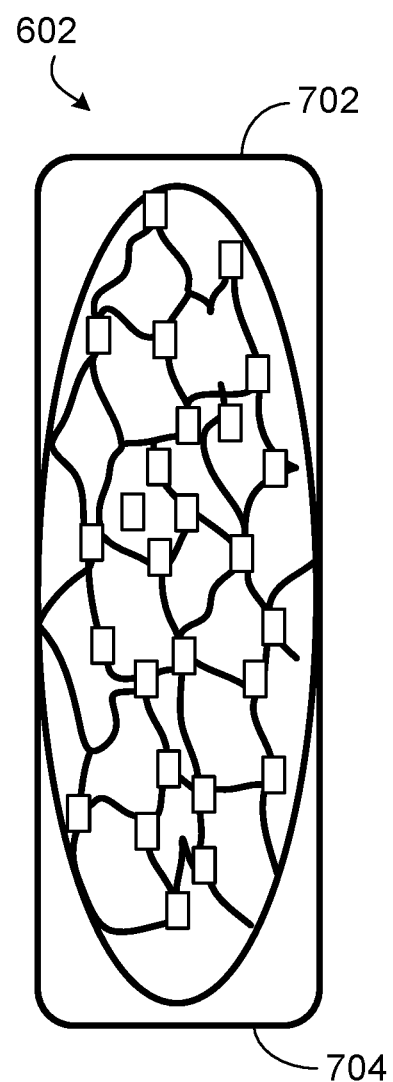
FIG. 7 is a cross section of a hydrogel packer of FIG. 6.

FIG. 7 is a cross section of the healed hydrogel packer 602 of FIG. 6. The uphole end is denoted by reference numeral 702. The downhole end is denoted by reference numeral 704. The hydrogel may be a self-healing hydrogel. Therefore, the hydrogel packer 602 may self-heal while residing in the annulus between the sand screen 418 and the formation surface 410. The hydrogel packer 602 may be PAM crosslinked via GO nanosheets. The PAM may be a copolymer of AM and DAC. The hydrogel packer may have PDA to promote adhesion of the hydrogel to the formation surface 410.

Figure 8:
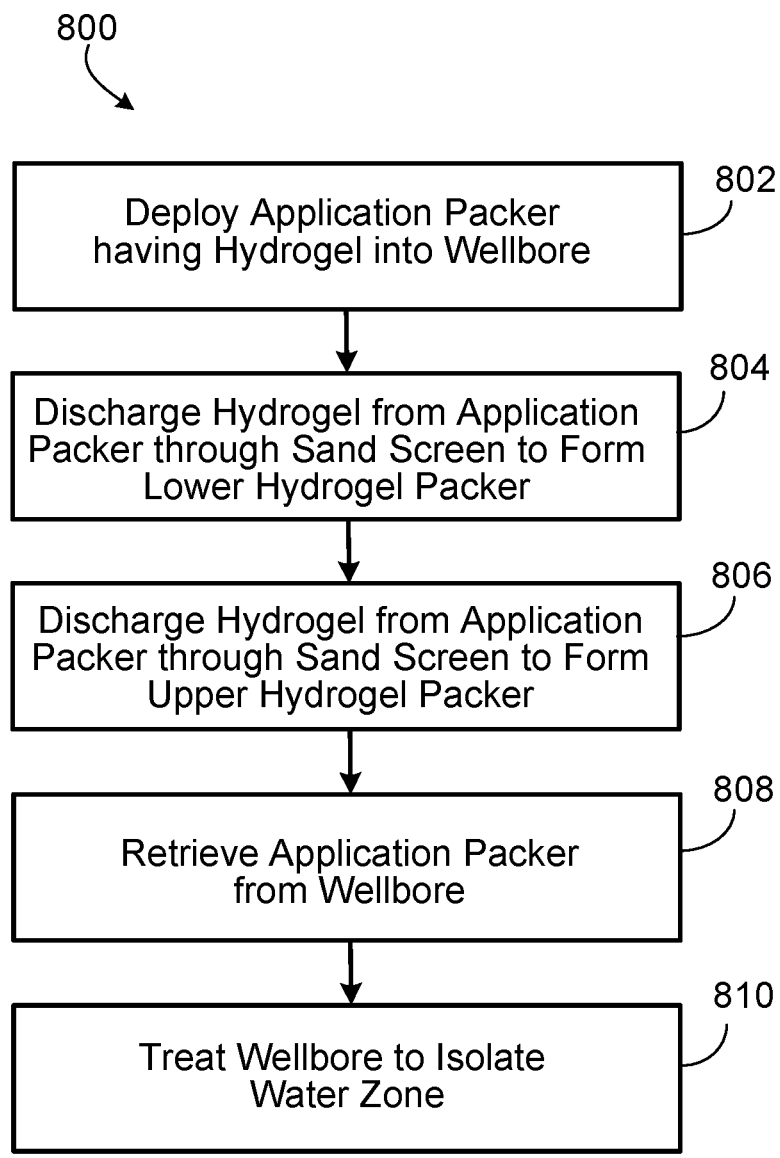
FIG. 8 is a block flow diagram of a method of isolating a water zone in a wellbore having a sand screen.

FIG. 8 is a method 800 of isolating a water zone in a wellbore having a sand screen. The wellbore is formed in a geological formation for hydrocarbon production.

At block 802, the method includes deploying (for example, via coiled tubing or a wireline) an application packer having hydrogel into the wellbore. The application packer holds hydrogel in a chamber or inner cavity. The hydrogel may be a cured formulation of cationic PAM, GO nanosheets, water, and an adhesion promoter (for example, PDA). The cationic PAM be a copolymer of AM and DAC. The monomers AM and DAC may be polymerized by radical polymerization such as chain growth. The cationic PAM may be crosslinked via the GO nanosheets. The mechanical properties, thermal properties, and self-healing ability of the hydrogel can be tuned by the GO content (amount) and the mass ratio of AM to DAC.

At block 804, the method includes discharging the hydrogel from the application packer through the sand screen to form or deploy a lower hydrogel packer below the water zone. The application packer may have nozzles for the discharge of the hydrogel. The discharging of the hydrogel may be via ejection through the nozzles from the chamber. The application packer may have a piston to drive the hydrogel from the chamber through the nozzles. The lower hydrogel packer is formed in the annulus between the sand screen and the wellbore wall or formation surface (sand face).

At block 806, the method includes discharging the hydrogel from the application packer through the sand screen to form an upper hydrogel packer in the annulus above the water zone. In some embodiments, two application packers are utilized. For instance, a first application packer injects hydrogel to deploy the lower hydrogel packer and a second application packer injects hydrogel to deploy the upper hydrogel packer.

The hydrogel may be a self-healing hydrogel. Thus, the hydrogel in the lower and upper hydrogel packers may self-heal in response to damage experienced in the injection of the hydrogel through the sand screen into the screen-formation annulus.

At block 808, the method may include retrieving the application packer (both application packers if two application packers are utilized) from the wellbore. The application packer(s) may be removed from the wellbore via the extension (for example, coiled tubing or a wireline) that lowered the application packer into the wellbore.

At block 810, the method includes treating the wellbore to isolate the water zone. The treatment may be mechanical or chemical, or both. The deployment of the upper and lower hydrogel packers in the screen-formation annulus has prepared the wellbore for the treatment.

To mechanically isolate the wellbore, a straddle packer (for example, a conventional straddle packer) may be deployed. An upper expandable sealing element of the straddle packer may be expanded against the sand screen at or near the upper hydrogel packer. A lower expandable sealing element of the straddle packer may be expanded against the sand screen at or near the lower hydrogel packer. Thus, with both the lower and upper sealing elements expanded and with the presence of the hydrogel packers, the water zone may be mechanically isolated.

The straddle packer may discharge a chemical (for example, a polymer or gel) into the water zone for chemical treatment for water shutoff. The chemical may damage (plug) the formation surface in the water zone. The presence of the hydrogel packers may prevent flow of the chemical through the screen-formation annulus to other regions of the wellbore outside of the water zone.

The straddle packer may be removed from the wellbore or the straddle packer may remain as deployed to continue to mechanically isolate the wellbore. If the straddle packer remains, a passage or through tubing of the straddle packer may accommodate flow of wellbore fluid (for example, production fluid) through an inner diameter of the straddle packer and through the isolated water zone without exposure of the wellbore fluid to the water zone.

In certain embodiments, the application packer (blocks 802, 804, 806) is a straddle packer having the chamber for the hydrogel and an anchoring module. In implementations, the application packer may resemble a conventional straddle packer but modified to include the chamber, nozzles, piston, and the anchoring module. The modified straddle packer may be lowered (block 802) into the wellbore.

The application packer as the modified straddle packer may be anchored to discharge or inject (block 804) the hydrogel to form or deploy the lower hydrogel packer in the screen-formation annulus. The modified straddle packer may be anchored to inject (block 806) the hydrogel to deploy the upper hydrogel packer in the annulus. The modified straddle packer may remain and be repositioned in the wellbore for the subsequent treatment (block 810) to isolate the water zone, as discussed earlier with respect to the conventional straddle packer.

An embodiment is a method of treating a wellbore in a geological formation for isolation of a water zone. The wellbore has a sand screen. The method includes deploying a first application packer into the wellbore to a lower target depth below the water zone. The method includes discharging hydrogel from the first application packer through the sand screen into an annulus between the sand screen and the geological formation to form a lower hydrogel packer in the annulus at the lower target depth. The method includes deploying a second application packer into the wellbore to an upper target depth above the water zone. The method includes discharging hydrogel from the second application packer through the sand screen into the annulus to form an upper hydrogel packer in the annulus at the upper target depth. The hydrogel may be a self-healing hydrogel. The lower hydrogel packer and the upper hydrogel packer may self-heal and adhere to rock of the geological formation. The first application packer may have a chamber holding the hydrogel. If so, the discharging of the hydrogel from the first application packer may involve discharging the hydrogel from the chamber through a nozzle of the first application packer. The hydrogel may include a cationic PAM and GO. In some implementations, the PAM may be a copolymer of AM and DAC. The hydrogel may include PDA. The method may include retrieving the first application packer from the wellbore to the Earth surface and retrieving the second application packer from the wellbore to the Earth surface. The method may include deploying a straddle packer into the wellbore to isolate the water zone. The method may include expanding upper and lower sealing elements of the straddle packer to mechanically isolate the water zone. The method may include discharging a chemical into the water zone from the straddle packer for water shutoff to isolate the water zone.

Another embodiment is a method of isolating a water zone in a wellbore in a geological formation. The wellbore has a sand screen. The method includes deploying an application packer into the wellbore to below the water zone. The method includes injecting self-healing hydrogel from the application packer through the sand screen into an annulus between the sand screen and the geological formation to form a lower hydrogel packer in the annulus. The application packer may include an inner cavity having the self-healing hydrogel. The injecting of the self-healing hydrogel from the application packer may involve discharging the hydrogel from the inner cavity through a nozzle of the application packer. The method may include raising the application packer to above the water zone and injecting self-healing hydrogel from the application packer through the sand screen into the annulus to form an upper hydrogel packer in the annulus. The self-healing hydrogel may include PAM, GO nanosheets, and an adhesion promoter. The adhesion promoter may be PDA. The adhesion promoter may be sodium silicate or aminosaline, or a combination thereof.

The method may include removing the application packer from the wellbore and deploying a straddle packer into the wellbore. The straddle packer has an upper expandable seal and a lower expandable seal to mechanically isolate the wellbore. The straddle packer has a through tubing for flow of wellbore fluid. The method may include deploying the straddle packer into the wellbore to chemically treat the water zone for water shutoff.

The method may include removing the application packer from the wellbore and deploying a second application packer into the wellbore to above the water zone. Thus, the method may include injecting self-healing hydrogel from the second application packer through the sand screen into the annulus to form an upper hydrogel packer in the annulus. The method may include removing the second application packer from the wellbore. In one implementation, the second application packer is the application packer replenished with hydrogel. The method may then include deploying a straddle packer into the wellbore to chemically treat the water zone for water shutoff.

The method may include removing the application packer from the wellbore and deploying a straddle packer into the wellbore to mechanically isolate the wellbore. The straddle packer may have through tubing for flow of wellbore fluid. The method may include flowing wellbore fluid through the through tubing. The wellbore fluid may include production fluid including hydrocarbon. The straddle packer may prevent introduction of water from the water zone into the wellbore fluid.

Yet another embodiment is a wellbore in a geological formation. The wellbore includes a sand screen. The wellbore has a lower hydrogel packer below a water zone in an annulus between the sand screen and the geological formation to facilitate isolation of the water zone. The wellbore has an upper hydrogel packer above the water zone in the annulus to facilitate isolation of the water zone. The lower hydrogel packer and the upper hydrogel packer each include a self-healing hydrogel. The self-healing hydrogel may be PAM and include a crosslinker (for example, GO) to promote self-healing of the self-healing hydrogel. The PAM may be a copolymer of AM and DAC. The self-healing hydrogel may include water. The crosslinker may include GO. The crosslinker may include a clay mineral, carbon nanotubes, or graphene nanosheets, or any combinations thereof. The self-healing hydrogel may include PDA.

Yet another embodiment is a method of isolating a water zone in a wellbore in a geological formation. The method includes deploying a straddle packer into the wellbore. The wellbore has a water zone and a sand screen. The straddle packer has a chamber holding hydrogel (for example, self-healing hydrogel). The method includes ejecting the hydrogel from the chamber through nozzles of the straddle packer to inject the hydrogel through the sand screen into an annulus between the sand screen and the geological formation to form a lower hydrogel packer in the annulus below the water zone. The method includes ejecting the hydrogel from the chamber through the nozzles to inject the hydrogel through the sand screen into the annulus to form an upper hydrogel packer in the annulus above the water zone. The method may include mechanically isolating the water zone. The mechanically isolating of the water zone may involve expanding an upper seal of the straddle packer and expanding a lower seal of the straddle packer. The method may include providing a chemical from the straddle packer to chemically isolate the water zone. The hydrogel may be a cationic PAM. The PAM may be a copolymer of AM and DAC. A mass ratio of the AM to the DAC may be in a range of 1:1 to 1:4. The hydrogel may be a self-healing hydrogel including graphene nanosheets, GO nanosheets, or carbon nanotubes, or any combinations thereof. The hydrogel may include PDA.

A number of implementations have been described. Nevertheless, it will be understood that various modifications may be made without departing from the spirit and scope of the disclosure.

What is claimed is:

1. A method of treating a wellbore in a geological formation for isolation of a water zone, comprising:
    deploying a first application packer into the wellbore to a lower target depth below the water zone, the wellbore comprising a sand screen;
    discharging hydrogel from the first application packer through the sand screen into an annulus between the sand screen and the geological formation to form a lower hydrogel packer in the annulus at the lower target depth;
    deploying a second application packer into the wellbore to an upper target depth above the water zone; and
    discharging hydrogel from the second application packer through the sand screen into the annulus to form an upper hydrogel packer in the annulus at the upper target depth, wherein the hydrogel comprises a cationic polyacrylamide (PAM) and graphene oxide (GO).

2. The method of claim 1, wherein the first application packer comprises a chamber holding the hydrogel, and wherein discharging the hydrogel from the first application packer comprises discharging the hydrogel from the chamber through a nozzle of the first application packer.

3. The method of claim 1, wherein the PAM comprises a copolymer of acrylamide (AM) and 2-(dimethylamino)ethylacrylatemethochloride (DAC).

4. The method of claim 1, wherein the hydrogel comprises polydopamine (PDA).

5. The method of claim 1, comprising retrieving the first application packer from the wellbore to an Earth surface and retrieving the second application packer from the wellbore to the Earth surface.

6. The method of claim 5, comprising deploying a straddle packer into the wellbore to isolate the water zone.

7. The method of claim 6, comprising expanding upper and lower sealing elements of the straddle packer to mechanically isolate the water zone.

8. The method of claim 6, comprising discharging a chemical into the water zone from the straddle packer for water shutoff to isolate the water zone.

9. A method of isolating a water zone in a wellbore in a geological formation, comprising:
deploying an application packer into the wellbore to below the water zone, wherein the wellbore comprises a sand screen; and
injecting hydrogel from the application packer through the sand screen into an annulus between the sand screen and the geological formation to form a lower hydrogel packer in the annulus, wherein the hydrogel comprises a cationic polyacrylamide (PAM), graphene oxide (GO) nanosheets, and an adhesion promoter.

10. The method of claim 9, wherein the application packer comprises an inner cavity having the hydrogel, and wherein injecting the hydrogel from the application packer comprises discharging the hydrogel from the inner cavity through a nozzle of the application packer.

11. The method of claim 9, comprising:
raising the application packer to above the water zone;
injecting hydrogel from the application packer through the sand screen into the annulus between the sand screen and the geological formation to form an upper hydrogel packer in the annulus; and
removing the application packer from the wellbore.

12. The method of claim 11, comprising deploying a straddle packer into the wellbore, wherein the straddle packer comprises an upper expandable seal and a lower expandable seal to mechanically isolate the wellbore.

13. The method of claim 12, wherein the straddle packer comprises a through tubing for flow of wellbore fluid.

14. The method of claim 11, comprising deploying a straddle packer into the wellbore to chemically treat the water zone for water shutoff.

15. The method of claim 11, comprising:
deploying a straddle packer into the wellbore to mechanically isolate the wellbore, wherein the straddle packer comprises through tubing for flow of wellbore fluid; and
flowing wellbore fluid through the through tubing, wherein the wellbore fluid comprises production fluid comprising hydrocarbon, and the straddle packer prevents introduction of water from the water zone into the wellbore fluid.

16. The method of claim 9, comprising:
removing the application packer from the wellbore;
deploying a second application packer into the wellbore to above the water zone;
injecting hydrogel from the second application packer through the sand screen into the annulus to form an upper hydrogel packer in the annulus; and
removing the second application packer from the wellbore.

17. The method of claim 16, wherein the second application packer comprises the application packer replenished with hydrogel.

18. The method of claim 16, comprising deploying a straddle packer into the wellbore to chemically treat the water zone for water shutoff.

19. The method of claim 9, wherein the adhesion promoter comprises polydopamine (PDA).

20. The method of claim 9, wherein the adhesion promoter comprises sodium silicate or aminosaline, or a combination thereof.

21. A wellbore in a geological formation, the wellbore comprising:
a sand screen;
a lower hydrogel packer below a water zone in an annulus between the sand screen and the geological formation to facilitate isolation of the water zone; and
an upper hydrogel packer above the water zone in the annulus to facilitate isolation of the water zone, wherein the lower hydrogel packer and the upper hydrogel packer each comprise a self-healing hydrogel comprising a cationic polyacrylamide (PAM) and a crosslinker comprising graphene oxide (GO) to promote self-healing of the self-healing hydrogel, and wherein the self-healing hydrogel comprises water.

22. The wellbore of claim 21, wherein the PAM comprises a copolymer of acrylamide (AM) and 2-(dimethylamino) ethylacrylatemethochloride (DAC).

23. The wellbore of claim 21, wherein the self-healing hydrogel comprises polydopamine (PDA).

24. A wellbore in a geological formation, the wellbore comprising:
a sand screen;
a lower hydrogel packer below a water zone in an annulus between the sand screen and the geological formation to facilitate isolation of the water zone; and
an upper hydrogel packer above the water zone in the annulus to facilitate isolation of the water zone, wherein the lower hydrogel packer and the upper hydrogel packer each comprise a self-healing hydrogel comprising a cationic polyacrylamide (PAM) and a crosslinker to promote self-healing of the self-healing hydrogel, wherein the crosslinker comprises a clay mineral, carbon nanotubes, or graphene nanosheets, or any combinations thereof.

25. A method of isolating a water zone in a wellbore in a geological formation, comprising:
deploying a straddle packer into the wellbore, wherein the wellbore comprises the water zone and a sand screen, and wherein the straddle packer comprises a chamber holding hydrogel;
ejecting the hydrogel from the chamber through nozzles of the straddle packer to inject the hydrogel through the sand screen into an annulus between the sand screen and the geological formation to form a lower hydrogel packer in the annulus below the water zone; and
ejecting the hydrogel from the chamber through the nozzles to inject the hydrogel through the sand screen into the annulus to form an upper hydrogel packer in the annulus above the water zone, wherein the hydrogel comprises a cationic polyacrylamide (PAM) and polydopamine (PDA).

26. The method of claim 25, comprising mechanically isolating the water zone, wherein mechanically isolating the water zone comprises expanding an upper seal of the straddle packer and expanding a lower seal of the straddle packer.

27. The method of claim 25, comprising providing a chemical from the straddle packer to chemically isolate the water zone.

28. A method of isolating a water zone in a wellbore in a geological formation, comprising:
    deploying a straddle packer into the wellbore, wherein the wellbore comprises the water zone and a sand screen, and wherein the straddle packer comprises a chamber holding hydrogel;
    ejecting the hydrogel from the chamber through nozzles of the straddle packer to inject the hydrogel through the sand screen into an annulus between the sand screen and the geological formation to form a lower hydrogel packer in the annulus below the water zone; and
    ejecting the hydrogel from the chamber through the nozzles to inject the hydrogel through the sand screen into the annulus to form an upper hydrogel packer in the annulus above the water zone, wherein the hydrogel comprises a cationic polyacrylamide (PAM) comprising a copolymer of acrylamide (AM) and 2-(dimethylamino)ethylacrylatemethochloride (DAC), and wherein a mass ratio of the AM to the DAC is in a range of 1:1 to 1:4.

29. A method of isolating a water zone in a wellbore in a geological formation, comprising:
    deploying a straddle packer into the wellbore, wherein the wellbore comprises the water zone and a sand screen, and wherein the straddle packer comprises a chamber holding hydrogel;
    ejecting the hydrogel from the chamber through nozzles of the straddle packer to inject the hydrogel through the sand screen into an annulus between the sand screen and the geological formation to form a lower hydrogel packer in the annulus below the water zone; and
    ejecting the hydrogel from the chamber through the nozzles to inject the hydrogel through the sand screen into the annulus to form an upper hydrogel packer in the annulus above the water zone, wherein the hydrogel comprises a cationic polyacrylamide (PAM), wherein the hydrogel comprises a self-healing hydrogel comprising graphene nanosheets, graphene oxide (GO) nanosheets, or carbon nanotubes, or any combinations thereof.

\* \* \* \* \*